A. T. WATSON.
Car Spring.
No. { 109. / 1,214. }
Reissued July 16, 1861.
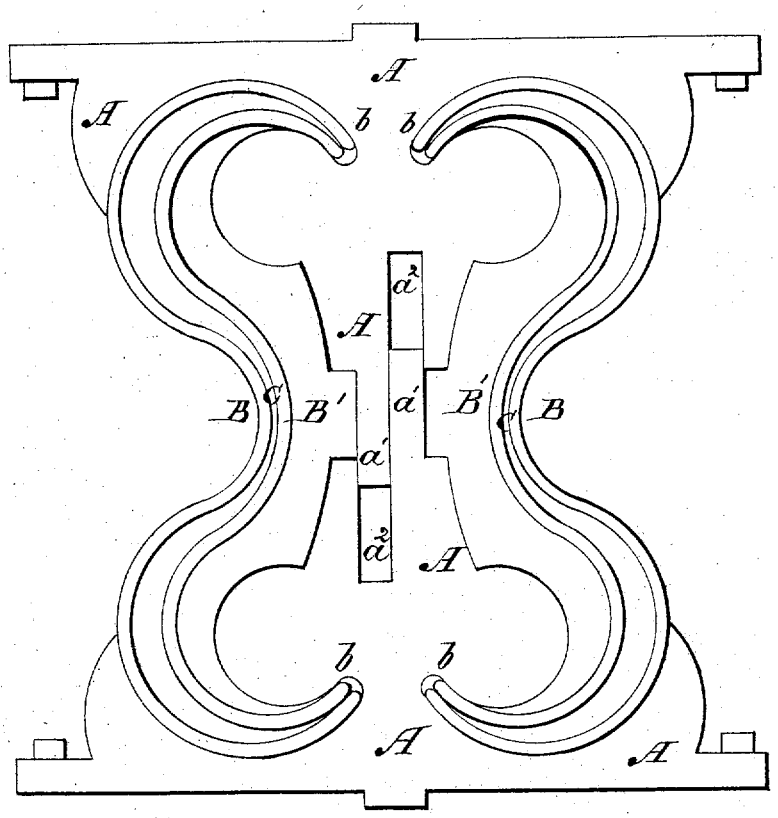
Witnesses:
L. B. Mastis
Richard Wimne
Inventor:
Alex: T. Watson
AM. PHOTO-LITHO. CO. N.Y. (OSBORNE'S PROCESS.)

UNITED STATES PATENT OFFICE.

ALEXANDER T. WATSON, OF CASTLETON, NEW YORK.

IMPROVED RAILROAD-CAR SPRING.

Specification forming part of Letters Patent No. 27,587, dated March 20, 1860; Reissue No. 1,214, dated July 16, 1861.

*To all whom it may concern:*

Be it known that I, ALEXANDER T. WATSON, of the town of Castleton, in the county of Richmond and State of New York, have invented a new and useful Railroad-Car Spring, and which may be adapted for use in other carriages and vehicles; and whereas Letters Patent of the United States were granted to me for said invention bearing date the 20th day of March, 1860, and which said Letters Patent I have surrendered in order that Letters Patent may be reissued to me for said invention upon an amended specification, pursuant to the acts of Congress in such case made and provided; now I do hereby declare the following to be my amended specification for such reissue, and that the same is a full and exact description of my said invention, reference being had to the accompanying drawings, making a part thereof The drawing represents a side elevation of the spring, and any vertical section thereof parallel to the face of the spring, as shown in the drawing, will represent the same figure.

My spring is composed of a solid frame for the spring-blades to operate in, and of the steel blades, which constitute the elastic material or portion of the spring.

In the drawing, the frame-work or setting is shown at A A A A. This is to be a casting of iron, brass, or any suitable composition metal. The frame consists of two parts, the top and the base, both parts being similar in all respects, and which lock into each other by a joint or slide, as shown at $a'$ $a'$, the open spaces $a^2$ $a^2$ being left for the play of the springs in the frame.

B B B′ B′ are steel blades or springs resembling in shape the numeral 3. They are placed together in pairs on opposite sides in the frame, and the width of the blade is the same as the thickness of the frame A. The blades should be made of good spring-steel. The curves of the blades are made in the same general outline, but nevertheless so far different from each other that they will touch only at their ends *b b*, the exterior blade being on curves of larger radius and being of greater length than the adjoining interior blade.

The blades being placed in the frames as shown in the drawing, when pressure is applied upon the frames the action will be first upon the exterior pair of blades, B B. As the pressure increases it will bring the interior pair of blades, B′ B′, into action, and both pair of blades will at the middle *c c* be forced outwards in opposition to the line of curve by reason of the line of pressure falling within the line of curve of the blades at their middle, while the curves toward the ends of the blades will, by the increase of pressure, be forced into smaller curves. In this manner, and by reason of the blades having their curves toward their ends in an opposite direction to the curves in the middle, the blades are prevented from coming into too short curves under pressure, which might make them liable to fracture.

The spring when complete for a body car-spring is about twelve inches in height by four in thickness. The thickness of the blades should depend upon the weight they are to carry, but three-sixteenth plates are about a fair average.

Having thus described my invention, what I claim therein as new, and for which I desire Letters Patent, is—

1. The manner of arranging and combining the two spring-blades B B′ in pairs of different lengths and curves vertically, as described, so that the curves of the blades when under pressure will not be liable to fracture from coming to too sharp an angle.

2. The form of the casting or frame A A, by which the springs are held in position and made to operate in the manner described.

ALEX. T. WATSON.

Witnesses:

J. B. STAPLES,

GEORGE W. FOX.